United States Patent
Sangameshwara et al.

(10) Patent No.: US 10,938,921 B2
(45) Date of Patent: Mar. 2, 2021

(54) METHOD AND APPARATUS FOR ASSOCIATING SERVICES IN AN ELECTRONIC DEVICE

(71) Applicant: Samsung Electronics Co., Ltd., Gyeonggi-do (KR)

(72) Inventors: Vijay Sangameshwara, Bangalore (IN); Siva Prasad Gundur, Bangalore (IN); Bhargav Madishetty, Bangalore (IN); Sreekanth Vadakkepurakkal Chandran, Bangalore (IN)

(73) Assignee: Samsung Electronics Co., Ltd

( * ) Notice: Subject to any disclaimer, the term of this patent is extended or adjusted under 35 U.S.C. 154(b) by 73 days.

(21) Appl. No.: 16/156,542

(22) Filed: Oct. 10, 2018

(65) Prior Publication Data

US 2019/0109909 A1 Apr. 11, 2019

(30) Foreign Application Priority Data

Oct. 10, 2017 (IN) .............................. 201641034927

(51) Int. Cl.
*G06F 15/173* (2006.01)
*H04L 29/08* (2006.01)
(Continued)

(52) U.S. Cl.
CPC .......... *H04L 67/16* (2013.01); *H04L 65/1006* (2013.01); *H04L 65/4061* (2013.01);
(Continued)

(58) Field of Classification Search
CPC ................ H04L 67/16; H04L 65/4061; H04M 1/72536; H04W 4/10; H04W 4/08
(Continued)

(56) References Cited

U.S. PATENT DOCUMENTS 6,731,927 B1  5/2004  Stern et al.
8,635,678 B2 * 1/2014  Raleigh ................. H04L 67/145
                                                        726/5

(Continued)

FOREIGN PATENT DOCUMENTS

WO  WO 2016/003750  1/2016
WO  WO 2016/039579  3/2016
WO  WO 2017/057962  4/2017

OTHER PUBLICATIONS

International Search Report dated Nov. 30, 2018 issued in counterpart application No. PCT/KR2018/009997, 14 pages.

(Continued)

*Primary Examiner* — Hee Soo Kim

(74) *Attorney, Agent, or Firm* — The Farrell Law Firm, P.C.

(57) ABSTRACT

A method for associating services in an electronic device is provided. The method includes sending, by a first electronic device, a first service with a first private association dialog (PAD) to a second electronic device, wherein the first PAD of the first service includes a first PAD identifier and sending, by the first electronic device, a second service with a second PAD to the second electronic device, wherein the second PAD of the second service includes a second PAD identifier that matches the first PAD identifier to associate the second service with the first service at the second electronic device.

12 Claims, 8 Drawing Sheets

(51) Int. Cl.
  *H04W 76/45* (2018.01)
  *H04M 1/725* (2021.01)
  *H04L 29/06* (2006.01)
  *H04W 4/10* (2009.01)
  *G06F 15/16* (2006.01)
  *H04W 4/08* (2009.01)
  *H04W 4/21* (2018.01)

(52) U.S. Cl.
  CPC ......... *H04M 1/72536* (2013.01); *H04W 4/10* (2013.01); *H04W 76/45* (2018.02); *H04W 4/08* (2013.01); *H04W 4/21* (2018.02)

(58) Field of Classification Search
  USPC .................................................. 709/223, 245
  See application file for complete search history.

(56) References Cited

U.S. PATENT DOCUMENTS

| | | | |
|---|---|---|---|
| 9,876,862 B1* | 1/2018 | Lambert | ................ H04L 67/16 |
| 2005/0044233 A1 | 2/2005 | Cai et al. | |
| 2008/0313615 A1 | 12/2008 | Cai et al. | |
| 2009/0268715 A1 | 10/2009 | Jansson | |
| 2010/0203908 A1* | 8/2010 | Jeong | ................ G06F 3/04883 |
| | | | 455/466 |
| 2014/0075033 A1 | 3/2014 | Doering et al. | |
| 2015/0188950 A1* | 7/2015 | Astrom | ............... H04L 65/1073 |
| | | | 709/228 |
| 2015/0244586 A1* | 8/2015 | Lee | ..................... H04L 41/0806 |
| | | | 709/223 |
| 2016/0044528 A1* | 2/2016 | den Hartog | ............. H04L 51/38 |
| | | | 370/235 |
| 2017/0251029 A1 | 8/2017 | Atarius et al. | |
| 2017/0289776 A1 | 10/2017 | Kim et al. | |
| 2019/0044980 A1* | 2/2019 | Russell | ............... H04L 65/4061 |

OTHER PUBLICATIONS

European Search Report dated Apr. 16, 2020 issued in counterpart application No. 18866446.0-1216, 12 pages.

Indian Examination Report dated Jul. 14, 2020 issued in counterpart application No. 201641034927, 6 pages.

* cited by examiner

METHOD AND APPARATUS FOR ASSOCIATING SERVICES IN AN ELECTRONIC DEVICE

CROSS-REFERENCE TO RELATED APPLICATION(S)

The present application is based on and claims priority under 35 U.S.C. § 119(a) to an Indian Patent Complete Application No. 201641034927, which was filed on Oct. 10, 2017, the entire disclosure of which is incorporated herein by reference.

BACKGROUND

1. Field

The present disclosure relates, generally, to an electronic device, and more particularly, to a method and apparatus for associating services in an electronic device.

2. Description of the Related Art

In internet protocol (IP) multimedia subsystems (IMS), different services with a same user/group can be rendered in a single window. Examples of such services can include messaging and file transfer inside mission critical push to talk (MCPTT) call (Requirements from 3rd generation partnership project (3GPP) technical specification (TS) 22.280 Section 8.4 single group with multiple MCX Services), messaging and streaming inside IMS game service, enriched call with actual call session and call-composer session, and the like. However, when two or more different services with the same user/group have to be rendered in a single window, association of these services is sometimes not captured in specifications. These services are typically served by different application servers and hence there is no possibility to associate these services.

In mission critical X (MCX) service, a procedure to associate two or more services at a receivers' side user interface design (user experience (UX)) is not straight forward due to the existence of one or more problems. For example, unlike traditional standalone service like voice over long-term evolution (VoLTE) call, messaging or the like, MCX service includes bundling of multiple services like mission critical push-to-talk (MCPTT), mission critical video (MCVideo), mission critical data (MCData) into one, to provide an enriched/hybrid service, and association of these services catered by different application servers (ASs) is not defined in the 3GPP standards.

Session initiation protocol in-dialog (SIP In-Dialog) is the basic mechanism when a second service is initiated inside the first service wherein association is implicit. To provide SIP In-Dialog, all the MCX services like MCPTT, MCData and MCVideo shall be deployed on same application server but has dis-advantages including: a) ASs in MCX network will be overloaded, b) traffic caused by each SIP session while initiating second, third services and so on can cause the session more instable or session breakup in case these initiated sessions introduces an error, c) in MCX where pre-arranged groups is the de facto service and while MCX claims to support a minimum 2000 users in the group (3GPP 22.179 Appendix C MCPTT scalability guide), if every user starts preforming the second, third service and so on within the first service context, this results to session description protocol (SDP) payload change and also an increase in size that can result in latency at the devices, ASs and state-full SIP proxies while processing the SDP payload, d) when there are multiple groups which are active on the AS simultaneously which is evident from the MCX specification that claims to support 500000 groups on MCX network (3GPP 22.179 Appendix C MCPTT scalability guide), and e) enhancing the AS to new services without effecting the existing active session is more complex; hence operators prefer to deploy each service independently on a separate AS and even standards are in favor of these.

Opting out SIP In-Dialog leaves the option for each service (MCPTT, MCVideo, MCData) to be designed as an independent server resulting in SIP Out-of-Dialog as the de-facto solution for realizing the combined/inter-working services, but there is no means or method to associate SIP Out-of-Dialog services served by different servers.

SIP Out-of-dialog has its own dis-advantages. For example, each service will have increased message size specifically due to the payload that carries redundant group/users information in every request. For example, in an Ad-hoc call, if a user wants to send a message/file transfer (FT) to the same set of users as in a call, the Ad-hoc call has to carry redundant group/user information.

Each service ID for services can also be different from MCPTT ID, MCVideo ID or MCData ID. Each service ID can be a part of a same pre-defined group. Association of the services with different service MCX IDs belonging to the same MCX user is very difficult.

In MCX Services, there is an issue in associating the context when a user starts a conversation message and then initiates a call with the same user, since a message is a transaction (without session) and a call is a session.

In MCX ad-hoc (temporary group) calls, the problem is still more evident as there is no pre-defined group, and the server needs a common tag to forward incoming second, third service to the correct set of users-list.

MCX service communication logs maintenance with co-relation also has the same issue, e.g., sending in-reply to a message later in the same context is not feasible with current mechanisms.

Moreover, when multiple instances of hybrid service run in parallel, like IMS gaming, which requires multiple services to be mapped to a context, association at a UX also presents a problem.

SUMMARY

The present disclosure has been made to address at least the disadvantages described above and to provide at least the advantages described below.

An aspect of the disclosure provides methods and systems for associating services in an electronic device. In accordance with an aspect, the method includes sending first service(s) to an electronic device, wherein a private association dialog (PAD) of the first service(s) is associated with an identifier and sending second service(s) to the electronic device by associating the identifier present in the PAD of the first service(s) with a PAD of the second service(s) to associate the second service(s) with the first service(s).

An aspect of the disclosure provides methods and systems for associating services in an electronic device. In accordance with an aspect, the method includes receiving first service(s) from an electronic device, wherein a PAD of the first service(s) is associated with an identifier, receiving second service(s) from the electronic device, wherein a PAD of the second service(s) is associated with the PAD identifier of the first service(s), and associating the second service(s)

with the first service(s) when the PAD identifier of the first service(s) matches with the PAD identifier of the second service(s).

An aspect of the disclosure provides an MCX network for associating services. In accordance with an aspect, the MCX network is configured to: receive a first service(s) to be transmitted to a second electronic device(s) from a first electronic device, wherein the first service(s) is associated with a, PAD with an identifier and device information of the second electronic device(s), transmit the first service(s) to the second electronic device(s) based on the group information, associate a second service(s) with the first service(s) on receiving the second service(s) from the first electronic device, wherein a PAD of the second service(s) is associated with the identifier present in the PAD of the first service(s), and transmit the second service(s) to the second electronic device(s) to associate the second service(s) in context with the first service(s) based on the group information of the second electronic device(s).

In accordance with an aspect, there is provided a method for associating services in an electronic device. The method includes sending, by a first electronic device, a first service with a first private association dialog (PAD) to a second electronic device, wherein the first PAD of the first service includes a first PAD identifier and sending, by the first electronic device, a second service with a second PAD to the second electronic device, wherein the second PAD of the second service includes a second PAD identifier that matches the first PAD identifier to associate the second service with the first service at the second electronic device.

In accordance with an aspect, there is provided a method for associating services in an electronic device. The method includes receiving, by a second electronic device, a first service with a first private association dialog (PAD) from a first electronic device, wherein the first PAD of the first service includes a first PAD identifier, receiving, by the second electronic device, a second service with a second PAD from the first electronic device, wherein the second PAD of the second service includes a second PAD identifier that matches the first PAD identifier of the first service, and associating, by the second electronic device, the second service with the first service.

In accordance with an aspect, there is provided an electronic device for associating services. The electronic device includes a transceiver and a processor operably coupled to the transceiver and configured to send a first service with a first private association dialog (PAD) to a second electronic device, wherein the first PAD of the first service includes a first PAD identifier and send a second service with a second PAD to the second electronic device, wherein the second PAD of the second service includes a second PAD identifier that matches the first PAD identifier to associate the second service with the first service at the second electronic device.

In accordance with an aspect, there is provided an electronic device for associating services. The electronic device includes a transceiver and a processor operably coupled to the transceiver and configured to receive a first service with a first private association dialog (PAD) from a first electronic device, wherein the first PAD of the first service includes a first PAD identifier, receive a second service with a PAD from the first electronic device, wherein the second PAD of the second service includes a second PAD identifier that matches the first PAD identifier of the first service, and associate the second service with the first service.

BRIEF DESCRIPTION OF DRAWINGS

The above and other aspects, features and advantages of certain embodiments of the disclosure will be more apparent from the following detailed description taken in conjunction with the accompanying drawings, in which.

DETAILED DESCRIPTION

Figure 1:
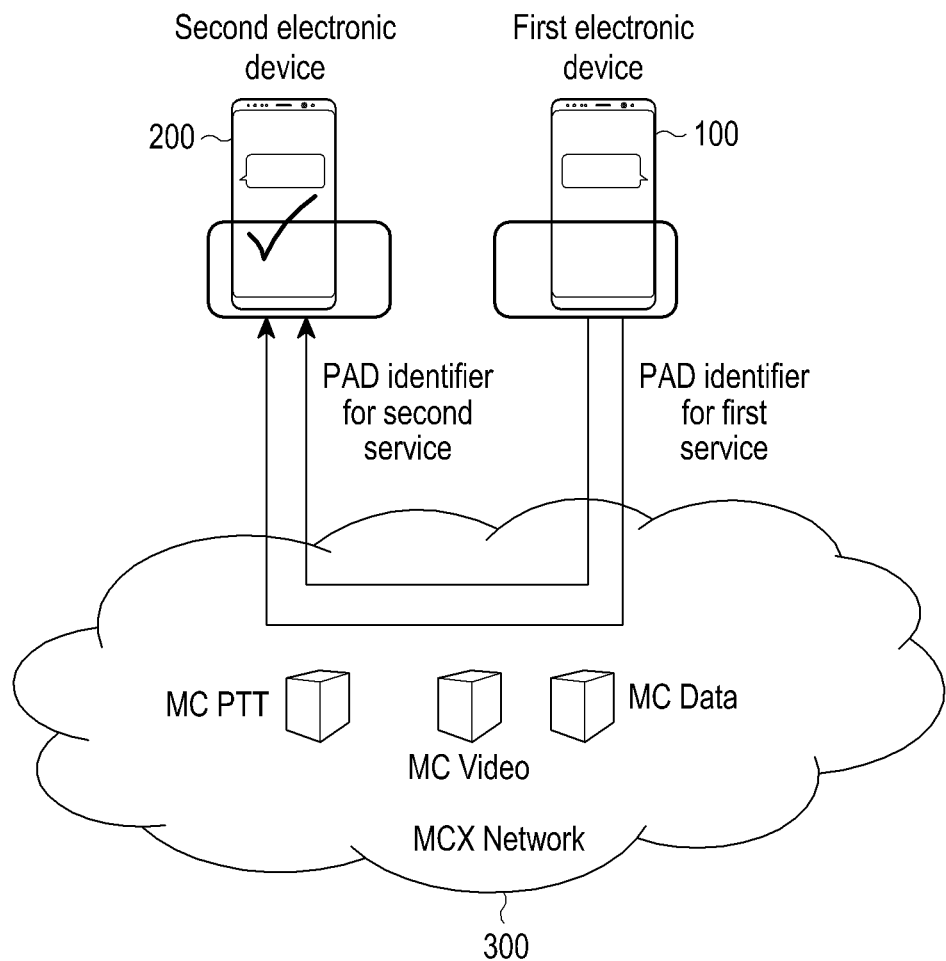
FIG. 1 is a diagram of an association of a second service initiated by a first electronic device with a first service in a UX of the first service in a second electronic device, according to an embodiment.

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish a component from another without limiting the components. These terms may be used for the purpose of distinguishing one element from another element. For example, a first user device and a second user device may indicate different user devices regardless of the order or importance. For example, a first element may be referred to as a second element without departing from the scope the disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

The terms used in describing the various embodiments of the disclosure are for the purpose of describing particular embodiments and are not intended to limit the disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an application-specific integrated circuit (ASIC) chip, a field-programmable gate array (FPGA), and a programmable-logic device for performing operations which has been known or are to be developed hereinafter.

An electronic device according to the disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an Internet of things (IoT) device (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

A method as described herein includes sending first service(s) to a second electronic device, wherein a PAD of the first service(s) is associated with an identifier and sending second service(s) to the second electronic device by associating the identifier present in the PAD of the first service(s) with a PAD of the second service(s) to associate the second service(s) with the first service(s) at the second electronic device.

A method as described herein includes receiving first service(s) from a first electronic device, wherein a PAD of the first service(s) is associated with an identifier, receiving second service(s) from the first electronic device, wherein a PAD of the second service(s) is associated with the PAD identifier of the first service(s), associating the second service(s) with the first service(s) when the PAD identifier of the first service(s) matches with the PAD identifier of the second service(s), and displaying the associated second service(s) in context with the first service(s) in a UX screen of the first service(s)

As described herein, a SIP header, e.g., a PAD, can be used to associate distinct services in mission critical systems (MCS). The value of the PAD can be used as an identifier (key), wherein the identifier can be used to associate distinct services to provide a combined service (i.e., enhanced/rich-hybrid service) experience to a user of the first and second electronic devices. The combined/interworking service, as used herein, can include two or more services inter-working together to provide an enriched experience, e.g., an MCX service where image transfer/message is sent inside a call context and shown on the same call UX as a threaded view. The second service(s) can be independent of the first service(s), e.g., any out-of-context file/message should still go to message box.

Hereinafter, an electronic device will be described with reference to the accompanying drawings. In the disclosure, the term "user" may indicate a person using an electronic device or a device (e.g., an artificial intelligence electronic device) using an electronic device.

FIG. 1 is diagram of an association of a second service initiated by a first electronic device 100 with a first service in a UX of the first service in a second electronic device 200, according to an embodiment.

The first electronic device 100 can be configured to insert a new identifier in the PAD, while initiating a first service with the second electronic device 200 if the first service is an independent service; this would be helpful if the user wants to initiate a second service, third service, etc. within the context of the first service, which could be converted into a combined/interworking service. On establishing the first service with second electronic device 200, the first electronic device 100 can be configured to initiate the second service within the same context of the first service initiated by the first electronic device 100. The first electronic device 100 can be configured to insert the same PAD identifier, which was inserted in the PAD of the first service.

The second service passes through an MC application server to the second electronic device 200. A server can identify the context of the second service and transmit the second service to the second electronic device 200 to associate the second service within the context of the first service. On receiving the second service at the second electronic device 200, the second electronic device 200 can be configured to identify the PAD identifier of the second service with other services available with the second electronic device 200.

If the PAD identifier of the second service matches the PAD identifier of the first service, the second electronic device 200 associates the second service with the first service in the UX screen of the first service. Further, the second electronic device 200 can be configured to display the associated services in the UX screen of the second electronic device 200.

Accordingly, a mechanism to combine the first and second services to provide an in-dialog/combined service experience can be provided. For example, the first service can be established between the first electronic device 100 and the second electronic device 200 through a first MCX application server and the second service can be established between the first electronic device 100 and the second electronic device 200 through a second MCX application server.

The methods and systems described herein enable associating two distinct services, wherein the two distinct services are launched in a same window. For example, a PTT call dialog and a message transfer dialog can be associated using a common identifier using the PAD. The PAD can be extended to any other services and any number of different services that need to be associated.

A message sent by the first electronic device 100 can be configured with a different identifier in the PAD, and the message sent by the first electronic device 100 can reach a message box/a new UX instance of the second electronic device 200. If a user of the first electronic device 100 wants to send the message out-of-context of the PTT call, the PAD of the message can be configured with a different identifier, so that the second electronic device 200 may receive the message in its message box and not in the PTT call context. The user can add the PAD with new identifier to the second service to provide extendibility in future if a third, a fourth service, etc. has to be performed in association with the second (independent) service to transform the second service to be combined/interworking service. The PTT call and the message act as two independent services in this case. Thus, the PAD can help to realize both combined service and independent service.

For example, the message/file transfer request can be performed before the PTT call, and the PTT call can be shown in the same context as the message as long as the PAD value of the message/file transfer service is the same as the PAD value of the PTT call.

An independent/standalone call or message/file transfer service can be performed by using different PAD identifiers, so that the service can be shown independent of each other. The PAD can be used to associate more than two services and also applicable to both one to one communication and group sessions.

Figure 2:
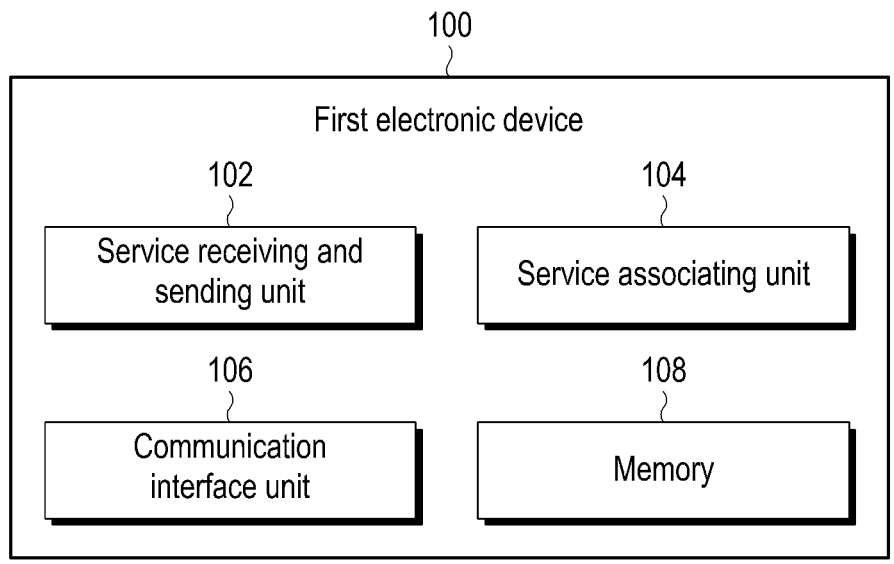
FIG. 2 is a diagram of a first electronic device for associating services, wherein the first electronic device is configured to associate a PAD identifier of a first service(s) with a PAD of the second service to associate the first service(s) and the second service(s) at the second electronic device, according to an embodiment.

FIG. 2 is a diagram of the first electronic device 100 for associating services, wherein the first electronic device 100 is configured to associate a PAD identifier of a first service(s) with a PAD of a second service to associate the first service(s) and the second service(s) at the second electronic device 200, according to an embodiment.

The first electronic device 100 can any of the aforementioned electronic devices and is capable of conducting MCX sessions. The first electronic device 100 includes a service receiving and sending unit 102, a service association unit 104, a communication interface unit 106 and a memory 108. The first electronic device may be include one or more processors. The service associating unit 104 may be operated by the processor, which may be referred to as a controller. The service receiving and sending unit 102 and/or the communication interface unit 106 may be a transceiver or other suitable device capable of performing the operations described herein.

The service receiving and sending unit 102 can be configured to send first service(s) to a second electronic device 200, wherein the service receiving and sending unit 102 can be configured to associate the PAD of the first service(s) with an identifier. The service receiving and sending unit 102 can be configured to send second service(s) to the second electronic device 200 by associating the identifier present in the PAD of the first service(s) with a PAD of the second service(s) to associate the second service(s) with the first service(s) at the second electronic device 200. The first and second service(s) can be, but are not limited to, MCX and other IP multimedia subsystem (IMS) services. Examples of the MCX service can be, but are not limited to MCPTT, MCVideo, MCData (Message/File-Transfer) or the like. Examples of the IMS service can be, but are not limited to, VoLTE call, enriched rich communication service (RCS) calls, IMS gaming or the like.

The communication interface unit 106 can be configured to establish communication between the first electronic device 100 and the second electronic device(s) 200 through an MCX network 300 (FIG. 1). The memory 108 can be configured to store service information. The memory 108 may include one or more non-transitory computer-readable storage media. The memory 108 may include non-volatile storage elements. Such non-volatile storage elements may include magnetic hard discs, optical discs, floppy discs, flash memories, or forms of electrically programmable memories (EPROM) or electrically erasable and programmable (EEPROM) memories. The term non-transitory may indicate that the storage medium is not embodied in a carrier wave or a propagated signal. However, the term non-transitory should not be interpreted to mean that the memory 108 is non-movable. In some examples, the memory 108 can be configured to store larger amounts of information than the memory. A non-transitory storage medium may store data that can, over time, change (e.g., in random access memory (RAM) or cache).

The PAD can be used by a server to associate services at the second electronic device 200. The PAD can be extendable to any application service, which converges multiple services into one. For example, IMS gaming, IMS enriched call or the like.

While FIG. 2 shows an example of the units/components of the first electronic device 100, it is to be understood that other units can also be included, or one or more the units may not be used.

Figure 3:
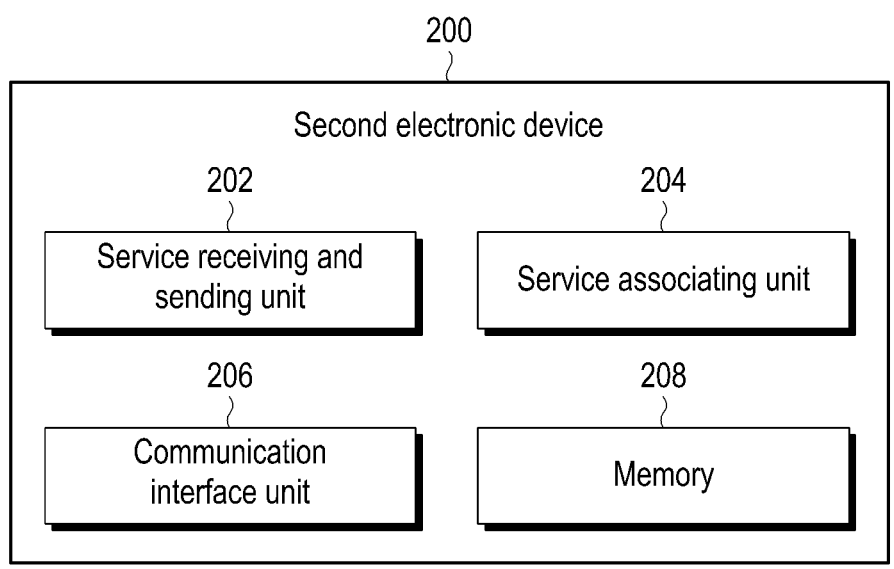
FIG. 3 is a diagram of units of a second electronic device to associate a first service(s) and a second service(s) at the second electronic device when a PAD identifier of the first service(s) matches with the PAD identifier of the second service(s), according to an embodiment.

FIG. 3 is a diagram of a second electronic device 200 to associate the first service(s) and the second service(s) at the second electronic device 200 when the PAD identifier of the first service(s) matches with the PAD identifier of the second service(s), according to an embodiment.

The second electronic device 200 can be the same type of electronic device as the first device 100, or it may be a different type of electronic device. The second electronic device 200 includes a service receiving and sending unit 202, a service association unit 204, a communication interface unit 206 and a memory 208. The second electronic device may include one or more processors. The service associating unit 204 may be operated by the processor. The processor may be referred to as a controller. The service receiving and sending unit 202 and/or the communication interface unit 206 may be a transceiver or other suitable device capable of performing the operations described herein.

The service receiving and sending unit 202 can be configured to receive first service(s) from the first electronic device 100. The service receiving and sending unit 202 can receive information related to the service, such as the PAD of the first service(s). The PAD can be associated with an identifier in the received information. The service receiving and sending unit 202 can be configured to receive second service(s) from the first electronic device 100.

The service association unit 204 can be configured to associate a PAD of the second service(s) with the PAD identifier of the first service(s). The service association unit 204 can be configured to associate the second service(s) with the first service(s) when the PAD identifier of the first service(s) matches the PAD identifier of the second service(s). The association of common PAD identifier with the first service and the second services establishes the in-dialog service. Examples of the first and second service(s) can be, but are not limited to, MCX and other IMS services.

Examples of the MCX service can be, but are not limited to MCPTT, MCVideo, MCData (Message/File-Transfer) or the like. Examples of the IMS service can be, but are not limited to, VoLTE call, enriched RCS calls, IMS gaming or the like. The service association unit 204 can be configured to display the associated second service(s) in context with the first service(s) in a UX screen of the first service(s).

On establishing by the first electronic device 100 the first service with the second electronic device 200, the first electronic device 100 can be configured to include the same PAD identifier which was included in the first service with the plurality of services to establish the in-dialog/combined service with the first service. The service association unit 104 of the first electronic device 100 can be configured to include the PAD identifier associated with the first service across the plurality of services for which the user wants to establish the in-dialog service at the second electronic device 200.

The communication interface unit 206 can be configured to establish communication between the first electronics device and the second electronic device through the MCX network 300. The memory 208 can be configured to store service information. The memory 208 may be configured the same as the memory 108, or may be configured differently from the memory 108.

Figure 4:
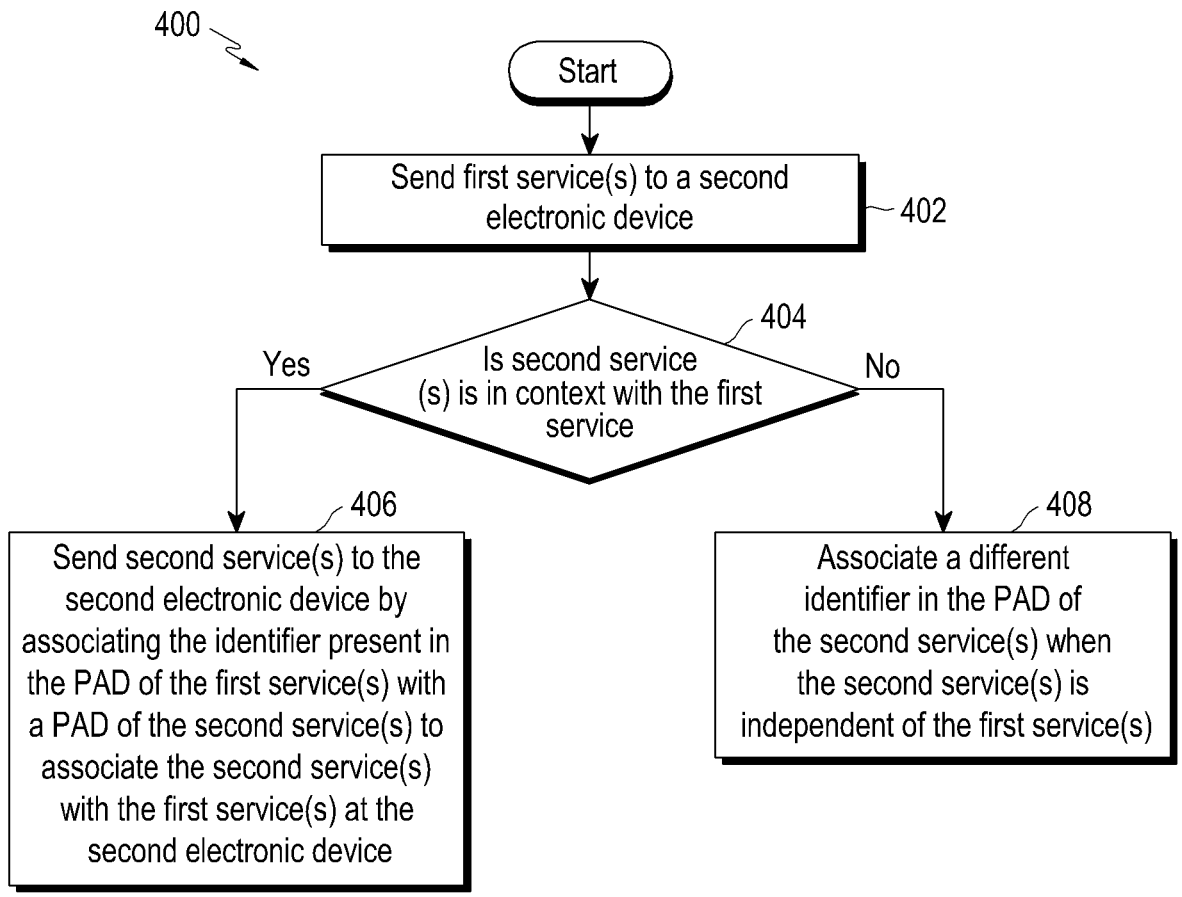
FIG. 4 is a flowchart of a method for associating services in a first electronic device by associating a PAD identifier of a first service(s) with a PAD of the second service(s) to associate the second service(s) with the first service(s), according to an embodiment.

FIG. 4 is a flowchart diagram 400 of a method for associating services in the first electronic device 100 by associating the PAD identifier of the first service(s) with the PAD of the second service(s) to associate the second service(s) with the first service(s), according to an embodiment.

At step 402, the first service(s) is sent to the second electronic device 200 using the service receiving and sending unit 102 0. The service receiving and sending unit 102 can send information related to the first service(s), such as the PAD of the first service(s). The PAD can be associated with an identifier in the sent information. The service receiving and sending unit 102 may be a transceiver. The PAD may be a SIP header. The PAD may include a PAD identifier, and the PAD identifier may be referred to as a PAD value.

At step 404, it is determined whether the second service(s) is in context with the first service(s), and if the second service(s) is determined to be in context with the first service(s), at step 406, the second service(s) is sent to the second electronic device 200 by associating the identifier present in the PAD of the first service(s) with a PAD of the second service(s) to associate the second service(s) with the first service(s) at the second electronic device 200. The service receiving and sending unit 102 is used to send second service(s) to the second electronic device 200 by associating the identifier present in the PAD of the first service(s) with the PAD of the second service(s) to associate the second service(s) with the first service(s) at the second electronic device 200. If the user initiates second service(s) in the UX of the first service(s), the service receiving and sending unit 102 can be configured to associate the same PAD identifier present in the PAD of the first service(s) in the PAD of the second service(s) to associate the first service(s) and the second service(s) at the second electronic device(s) 200.

More specifically, a first electronic device may send, to one or more second electronic devices, a first service with a first PAD to the second electronic device, wherein the first PAD of the first service includes a first PAD identifier. The first electronic device may be further configured to send, to the second electronic device, a second service with a second PAD to the second electronic device, wherein the second PAD of the second service includes a second PAD identifier that matches with the first PAD identifier to associate the second service with the first service at the second electronic device.

Also at step 404, it is determined whether the second service(s) is in context with the first service(s), and if the second service(s) is determined to be out of context with the first service(s), at step 408, a different identifier is associated in the PAD of the second service(s) when the second service(s) is independent of the first service(s). For example, if the user initiates second service(s) outside the UX of the first service(s), the service receiving and sending unit 102 can be configured to associate a different PAD identifier in the PAD of the second service(s) to receive the second service(s) as an independent services at the second electronic device(s) 200.

The various actions, acts, blocks, steps, or the like in the method of FIG. 4 (and the methods other described below) may be performed in the order presented, in a different order or simultaneously. Further, some of the actions, acts, blocks, steps, or the like may be omitted, added, modified, skipped, or the like.

More specifically, a first electronic device may send, to one or more second electronic devices, a third service with a third PAD to the second electronic device, wherein the third PAD of the third service includes a third PAD identifier that is different from the first PAD identifier, wherein the third service is independent of the at least one first service.

Figure 5:
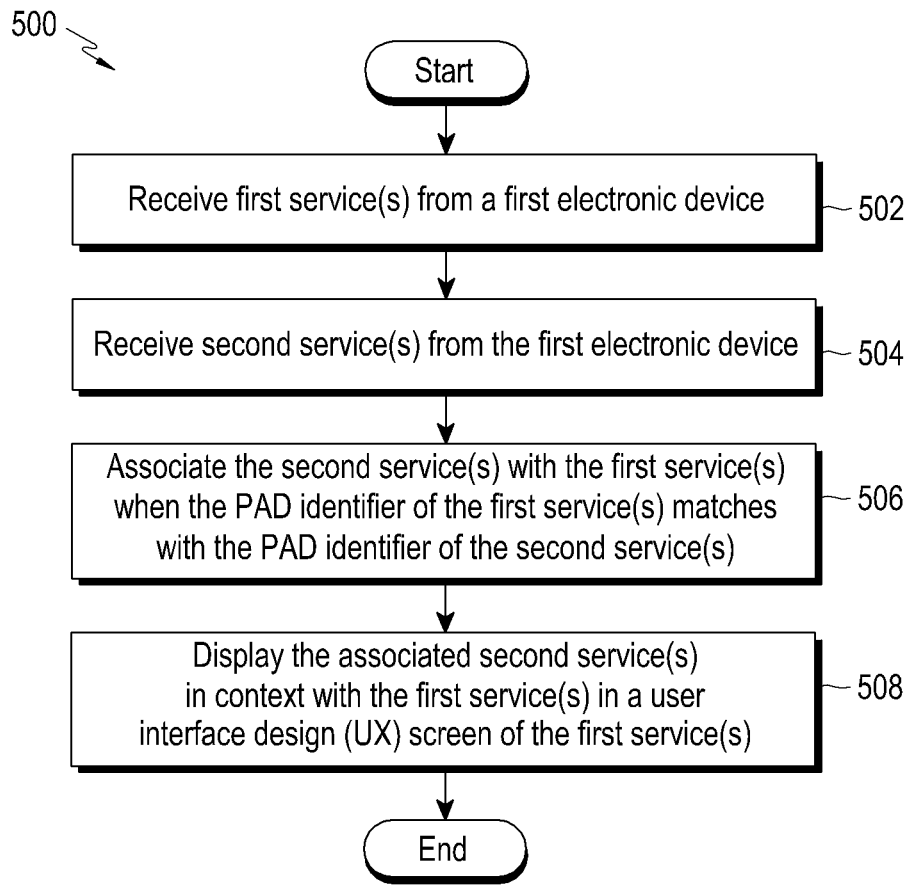
FIG. 5 is a flowchart of a method for associating services in the second electronic device when the PAD identifier of the first service(s) matches with the PAD identifier of the second service(s), according to an embodiment.

FIG. 5 is a flowchart 500 of a method for associating services in the second electronic device 200 when the PAD identifier of the first service(s) matches the PAD identifier of the second service(s), according to an embodiment.

At step 502, the g first service(s) is received from the first electronic device 100, using the service receiving and sending unit 202. The first electronic device 100 can be configured to include the PAD with the first service(s), wherein the PAD is associated with an identifier to uniquely identify the service. The PAD identifier can be generated by the first electronic device 100 while initiating the first service(s).

At step 504, the second service(s) receives from the first electronic device 100, using the service receiving and sending unit 202. The PAD of the second service(s) is associated with the PAD identifier of the first service(s). To associate the first service(s) and the second service(s) in a same context, the second service initiated by the first electronic device 100 can be configured to include the same PAD identifier which is included in the first service(s).

At step 506, the PAD identifier associated with the second service(s) is checked, and the second service(s) is associated with the first service(s) when the PAD identifier of the first service(s) matches with the PAD identifier of the second service(s). The service association unit 204 is used to check the PAD identifier associated with the second service(s) and associate the second service(s) with the first service(s) when the PAD identifier of the first service(s) matches with the PAD identifier of the second service(s).

At step 508, the associated second service(s) is displayed in context with the first service(s) in a UX screen of the first service(s), using the service association unit 204.

Figure 6:
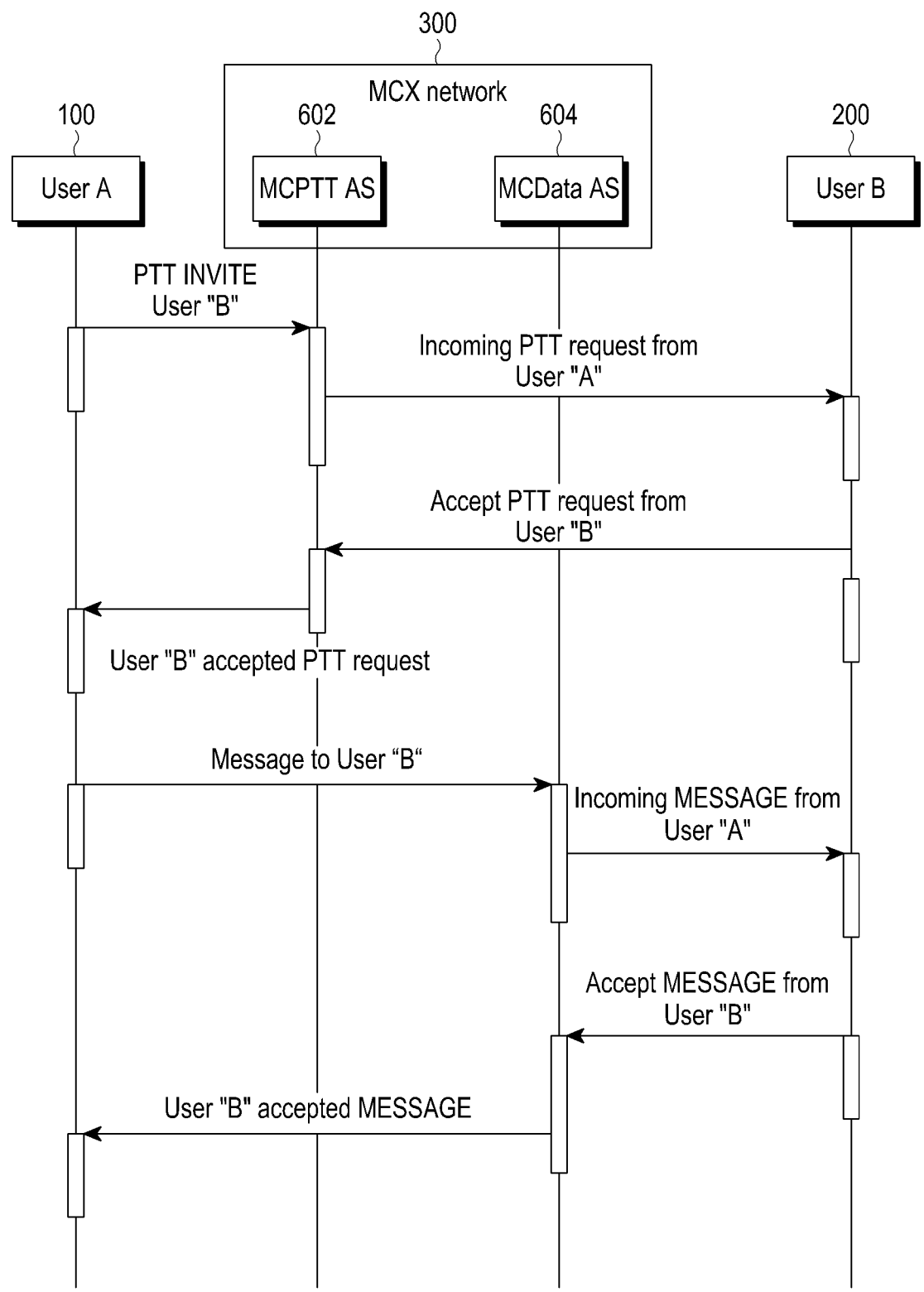
FIG. 6 is a signaling diagram of a call flow mechanism used to associate a message in context with a PTT call when the message is initiated in the same UX of the PTT call, according to an embodiment.

FIG. 6 is a signaling diagram of a call flow mechanism to associate a message in context with a PTT call when the message is initiated in the same UX of the PTT call, according to an embodiment.

The first electronic device 100 initiates a PTT call invite request to the second electronic device 200 through the MCPTT AS 602. The PAD of the PTT call can be configured to include an identifier. The second electronic device 200 accepts the PTT request and sends an acknowledgement through the MCPTT AS 602. The first electronic device 100 can be configured to send a message to the second electronic device 200, through the MCData application server (AS) 604, wherein the PAD of the message can be configured to include the same identifier, which is included in the PAD of the PTT call. The second electronic device 200 accepts the incoming message request and identifies the identifier associated with PAD of the message. The second electronic device 200 determines whether the PAD identifier of the message and the PAD identifier of the PTT call are same. Then the second electronic device 200 can be configured to render message on the PTT call context on the PTT call window. The second electronic device 200 can be configured to send an acknowledgement to the first electronic device 100 through the MCData AS 604.

Figure 7:
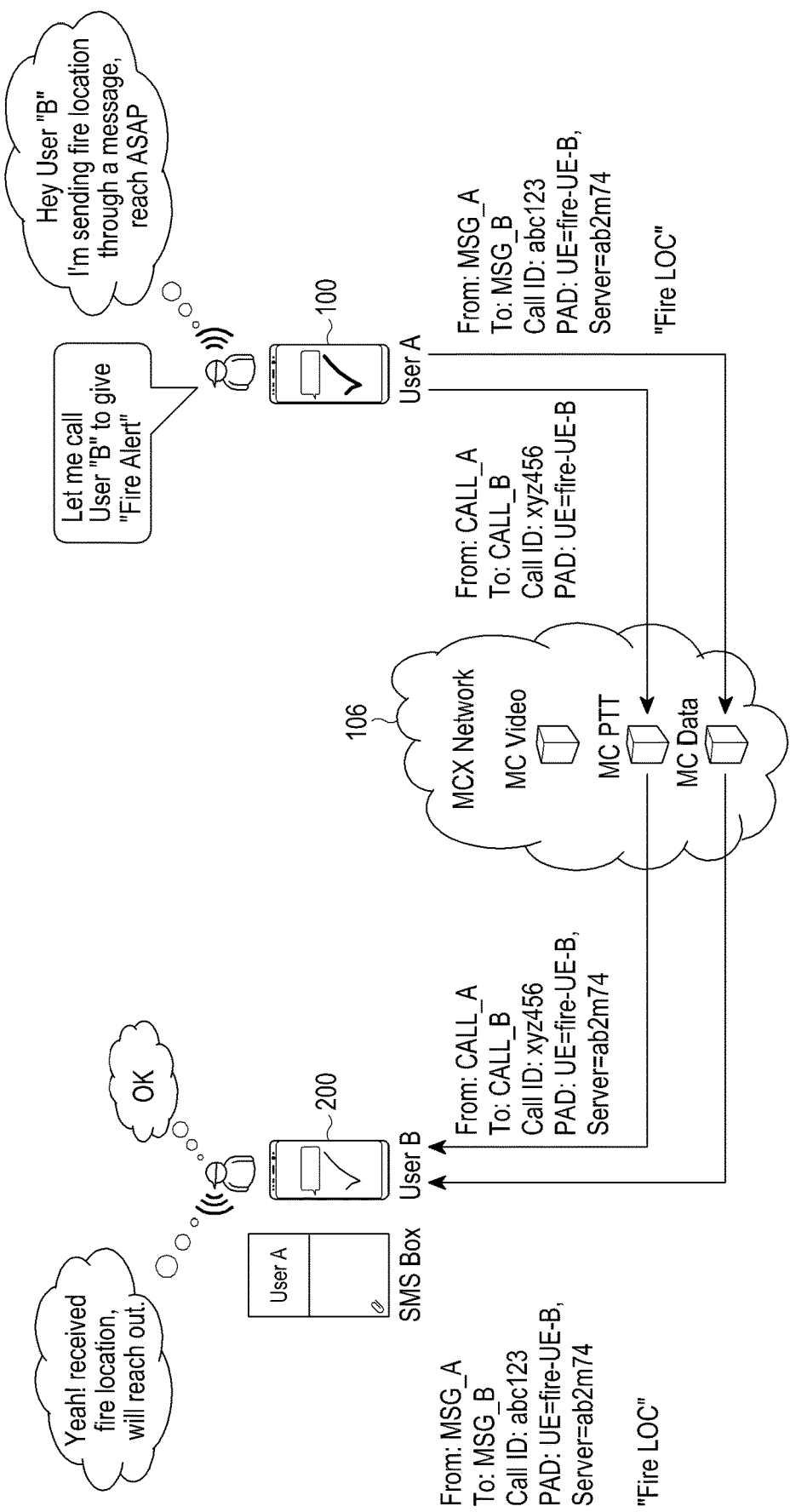
FIG. 7 is a diagram of sending a message inside a PIT private call, according to an embodiment.

FIG. 7 is a diagram of sending a message inside a push to talk (PTT) private call, according to an embodiment.

The first electronic device 100 can be configured to insert an identifier in the PAD, while initiating a PTT call with the second electronic device 200. On establishing the PTT call with second electronic device 200, the user of the first electronic device 100 may want to send a message to the second electronic device 200 in a same context of the PTT call initiated by the first electronic device 100. Therefore, the first electronic device 100 can be configured to insert the same PAD identifier, which was inserted in the PAD of the PTT call, into the message. The message passes through the MCData application server to the second electronic device 200. The MCData server also identifies the context of the message received from the first electronic device 100 and transmits the message to the second electronic device 200 to associate the message with PTT call context.

On receiving the message at the second electronic device 200, the second electronic device 200 can be configured to identify the PAD identifier of the message with other services available with the second electronic device 200 (i.e., PTT call). If the PAD identifier of the message matches the PAD identifier of the PTT call, the second electronic device 200 associates the message with PTT call in the PTT call UX screen. The second electronic device 200 can be configured to display the associated services in the PTT call UX screen of the second electronic device 200. Thus, a mechanism to combine the PTT call and the message to provide a combined service is provided.

Figure 8:
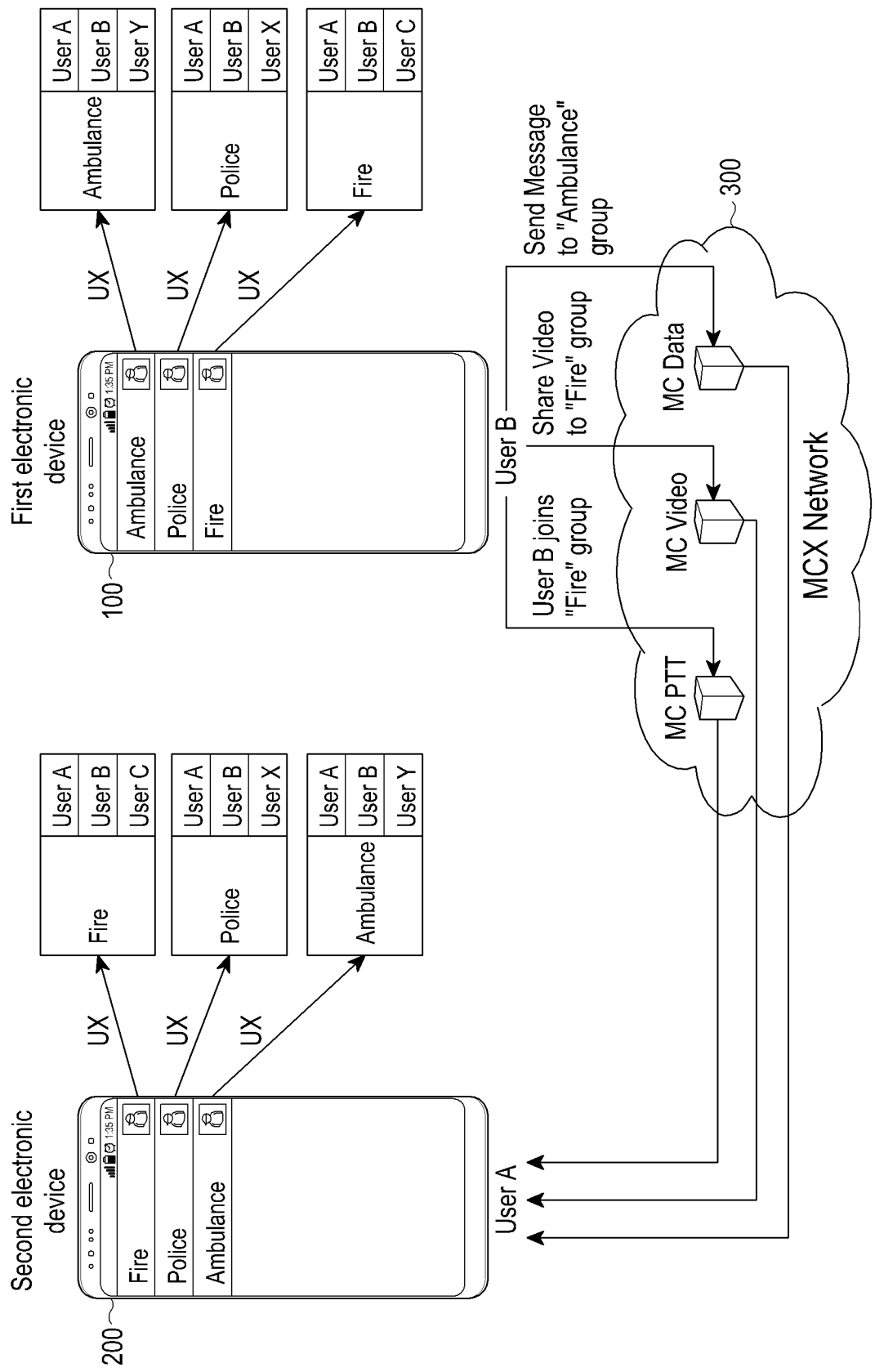
FIG. 8 is a diagram of an association of a service initiated by the first electronic device with a PIT group call UX at the second electronic device and other group member's electronic devices, according to an embodiment.

FIG. 8 is a diagram of a service initiated by the first electronic device 100 with a PTT group call UX at the second electronic device 200 and other group member's electronic devices, according to an embodiment.

The first electronic device 100 and the second electronic device 200 can be a part of a multiple active PTT ad-hoc group such as fire, police and ambulance, etc. The first electronic device 100 initiates a PTT group call (i.e., first service) with the fire group member electronic devices, wherein the PTT group call is associated with a new PAD identifier and device information about the fire group member electronic devices. The MCX network 300 receives PPT group call request to the fire group member electronic devices, wherein the MCX 300 stores the PAD identifier and device information associated with the fire group member electronic devices for future combined service with the fire group member electronic devices. The MCX network 300 adds a server attribute to the PTT call and establishes the PTT group calls with the fire group member electronic devices. The first electronic device 100 can be configured to send a video (i.e., second service) to all the fire group member electronic devices in context with the established PTT group call.

The first electronic device 100 can be configured to send a video to the fire group member electronic devices (i.e., second electronic device 200 and other fire group members electronic devices) through the MCX network 300 (e.g., MCVideo AS), wherein the PAD of the message carrying video can be configured to include the same identifier, which is included in the PAD of the fire group PTT call instead of adding the redundant group members of the fire group call again.

Based on the PAD identifier, the MCX network 300 can identify the associated service (i.e., first service) and the device information associated with the first service. The MCVideo AS (MCX network 300) can determine the fire group member electronic devices to whom the video is forwarded with interaction inside MCX Network 300. Thus PAD can offload the redundant group members' information to be passed in a second, third, etc., service in case of PTT group calls in MCX, which reduces the latency in MCX AS, SIP Proxies and devices.

Based on the PAD identifier, the second electronic device 200 and other fire group members electronic devices can identify the in-context services and associate the video service with group call in a group call user interface. Similarly, with the help of PAD identifier associated with the group call, the user can associate other services with the group call interface at the second electronic device 200, and other fire group member electronic devices by associating the services with the same PAD identifier associated with the group call.

Figure 9:
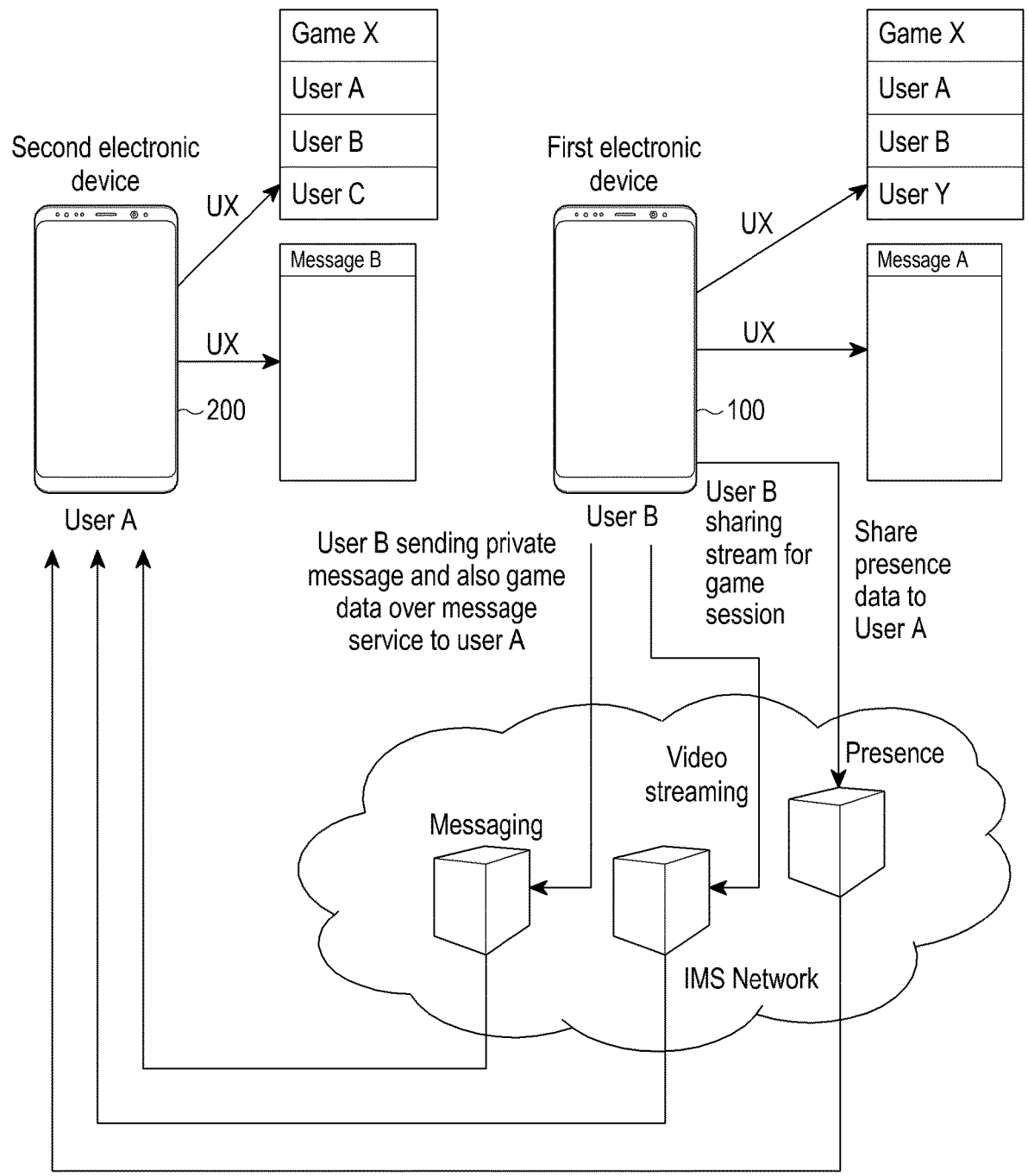
FIG. 9 is a diagram of an association of services in IMS gaming, according to an embodiment.

FIG. 9 is a diagram of service in IMS gaming, according to an embodiment.

IMS gaming is another IMS service like enriched calling, which can help an operator in regaining the subscriber base from over the top (OTT). IMS gaming can be another hybrid service, if it has to provide rich gaming experience to compete with other non-IMS gaming service and can support multi-players too, with the aid of VoLTE conference and enriched rich communication service (RCS) group communication. With the current existing IMS services like VoLTE and video over LTE (ViLTE) (video share) for streaming service and messaging services, there is a possibility of realizing numerous new games. In a gaming scenario, as shown in FIG. 9, when User A & B are participating in a multi-player game and a private messaging session at the same time, the same problem of UX association can be solved using PAD.

For example, user A (i.e., second electronic device 200) is participating in a multi-player game with a group of users. The group of users includes user B (i.e., first electronic device 100), user C, etc. The user B wants to share a private message and a game data over a messaging service through IMS messaging application server to the second electronic device 200. That is, the user B wants to associate the private message and the game data with the gaming user interface of the second electronic device 200. In order to associate the private message and the game data with the gaming user interface, the user B has to use the same PAD identifier, which is used in initiating the multi-player game. The first electronic device 100 can be configured to use the same PAD identifier, which is used in initiating the multi-player game.

On receiving the private message and the game data at the second electronic device 200, the second electronic device 200 identifies the PAD identifier associated with the private message and the game data. If the PAD identifier associated with multi-player game matches the PAD identifier associated with the private message and the game data, the second electronic device 200 can be configured to associate the private message and the game data with gaming user interface. Similarly, user B can share a stream for game session through IMS video streaming application server by including the same PAD identifier associated with multi-player game. Similarly, user B can share a presence data through IMS presence application server by including the same PAD identifier associated with multi-player game.

A method for associating services in an electronic device is provided. The method includes sending, by a first electronic device, a first service with a first PAD to a second electronic device, wherein the first PAD of the first service includes a first PAD identifier, and sending, by the first electronic device, a second service with a second PAD to the second electronic device, wherein the second PAD of the second service includes a second PAD identifier that matches with the first PAD identifier to associate the second service with the first service at the second electronic device.

The method further comprises associating the at least one second service and the at least one first service to display the at least one second service in context with the at least one first service in a user interface design (UX) screen of the at least one first service.

The method further includes sending, by the first electronic device, at least one third service with a third PAD to the at least one second electronic device, wherein the third PAD of the at least one third service includes a third PAD identifier which is different from the first PAD identifier, wherein the at least one third service is independent of the at least one first service.

The method further includes associating the at least one second service with the at least one first service established with a group of electronic devices, wherein the second PAD identifier of the least one second service matches with the first PAD identifier of the at least one first service.

The group includes at least one of a pre-defined group and an ad-hoc group.

The at least one first service and the at least one second service includes at least one of a mission critical service (MCX) and an IP multimedia subsystem (IMS) service.

The at least one first service and the at least one second service is transmitted through a mission critical service (MCX) network to the at least one second electronic device.

A method for associating services in an electronic device is provided. The method includes receiving, by a second electronic device, a first service with a first PAD from a first electronic device, wherein the first PAD of the first service includes a first PAD identifier, receiving, by the second electronic device, a second service with a second PAD from the first electronic device, wherein the second PAD of the second service includes a second PAD identifier which matches the first PAD identifier of the first service, and associating, by the second electronic device, the second service with the first service.

The method further includes displaying the at least one second service in context with the at least one first service in a user interface design (UX) screen of the at least one first service.

The method further includes receiving, by the at least one second electronic device, at least one third service with a third PAD from the first electronic device, wherein the third PAD of the at least one third service includes a third PAD identifier which is different from the first PAD identifier, wherein the at least one third service is independent of the at least one first service.

The method further includes associating the at least one second service with the at least one first service established with a group of electronic devices, wherein the second PAD identifier matches with the first PAD identifier.

A mission critical services (MCX) network 300 for associating services is provided. The MCX network 300 is configured to receive a first service to be transmitted to a second electronic device 200 from a first electronic device 100, wherein the first service is associated with a PAD with an identifier and a device information of the second electronic device 200, transmit the first service to the second electronic device 200 based on the device information, associate a second service with the first service on receiving the second service from the first electronic device 100, wherein a PAD of the second service is associated with the identifier present in the PAD of the first service, and transmit the second service to the second electronic device 200 to associate the second service in context with the first service based on the group information of the second electronic device 200.

The MCX network 300 may be further configured to transmit the at least one second service independent of the at least one first service when the PAD identifier of the at least one second service is different from the PAD identifier of the at least one first service.

The MCX network 300 may be further configured to associate the at least one second service with the at least one first service established with a group of electronic devices, when the PAD identifier of the at least one second service matches with the PAD identifier of the at least one first service.

The group includes at least one of a pre-defined group and an ad-hoc group.

The at least one first service and the at least one second service includes at least one of an MCX and an IP multimedia subsystem (IMS) service.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. A method for associating data related to services in an electronic device, the method comprising:
    sending, by a first electronic device, first data related to a first service with a first private association dialog (PAD) to a second electronic device, wherein the first PAD of the first data includes a first PAD identifier;
    sending, by the first electronic device, second data related to a second service with a second PAD to the second electronic device, wherein the second PAD of the second data includes a second PAD identifier that matches the first PAD identifier for associating the second service with the first service at the second electronic device; and
    sending, by the first electronic device, third data related to the second service with a third PAD to the second electronic device, wherein the third PAD of the third data includes a third PAD identifier that is unassociated with the first PAD identifier,
    wherein the second data associated with the first data is displayed in a first user experience (UX) screen of the first service at the second electronic device, and the third data is displayed in a second UX screen of the second service at the second electronic device.

2. The method of claim 1, further comprising sending, by the first electronic device, fourth data related to a fourth service with a fourth PAD to the second electronic device, wherein the fourth PAD of the fourth data includes a fourth PAD identifier that is different from the first PAD identifier, and wherein the fourth data is independent of the first data.

3. The method of claim 1, wherein the first service and the second service include one of a mission critical service (MCX) and an internet protocol (IP) multimedia subsystem (IMS) service.

4. A method for associating data related to services in an electronic device, the method comprising:
    receiving, by a second electronic device, first data related to a first service with a first private association dialog (PAD) from a first electronic device, wherein the first PAD of the first data includes a first PAD identifier;
    receiving, by the second electronic device, second data related to a second service with a second PAD from the first electronic device, wherein the second PAD of the second data includes a second PAD identifier that matches the first PAD identifier;
    associating, by the second electronic device, the second service with the first service;
    receiving, by the second electronic device, third data related to the second service with a third PAD from the first electronic device, wherein the third PAD of the third data includes a third PAD identifier that is unassociated with the first PAD identifier;
    displaying, by the second electronic device, the second data associated with the first data in a first user interface design (UX) screen of the first service; and
    displaying, by the second electronic device, the third data in a second UX screen of the second service.

5. The method of claim 4, further comprising:
    receiving, by the second electronic device, fourth data related to a fourth service with a fourth PAD from the first electronic device, wherein the fourth PAD of the fourth data includes a fourth PAD identifier that is different from the first PAD identifier, and wherein the fourth data is independent of the first data.

6. The method of claim 4, wherein the first service includes one of a mission critical service (MCX) and an internet protocol (IP) multimedia subsystem (IMS) service.

7. An electronic device for associating data related to services, the electronic device comprising:
    a transceiver; and
    at least one processor operably coupled to the transceiver and configured to:
    send first data related to a first service with a first private association dialog (PAD) to the second electronic device, wherein the first PAD of the first data includes a first PAD identifier,
    send second data related to a second service with a second PAD to the second electronic device, wherein the second PAD of the second data includes a second PAD identifier that matches the first PAD identifier for associating the second service with the first service at the second electronic device, and
    send third data related to the second service with a third PAD to the second electronic device, wherein the third PAD of the third data includes a third PAD identifier that is different from the first PAD identifier,
    wherein the second data associated with the first data is displayed in a first user experience (UX) screen of the first service at the second electronic device, the third data is displayed in a second UX screen of the second service at the second electronic device.

8. The electronic device of claim 7, wherein the at least one processor is further configured to:
send fourth data related to a fourth service with a fourth PAD to the second electronic device, wherein the fourth PAD of the fourth data includes a fourth PAD identifier that is different from the first PAD identifier, and wherein the fourth data is independent of the first data.

9. The electronic device of claim 7, wherein the first service and the second service include one of a mission critical service (MCX) and an internet protocol (IP) multimedia subsystem (IMS) service.

10. An electronic device for associating data related to services, the electronic device comprising:
a transceiver; and
at least one processor operably coupled to the transceiver and configured to:
receive first data related to a first service with a first private association dialog (PAD) from a first electronic device, wherein the first PAD of the first data includes a first PAD identifier,
receive second data related to a second service with a second PAD from the first electronic device, wherein the second PAD of the second data includes a second PAD identifier that matches the first PAD identifier,
associate the second service with the first service,
receive third data related to the second service with a third PAD from the first electronic device, wherein the third PAD of the third data includes a third PAD identifier that is different from the first PAD identifier,
display the second data associated with the first data in a first user interface design (UX) screen of the first service, and
display the third data in a second UX screen of the second service.

11. The electronic device of claim 10, wherein the at least one processor is further configured to:
receive, fourth data related to a fourth service with a fourth PAD from the first electronic device, wherein the fourth PAD of the fourth data includes a fourth PAD identifier that is different from the first PAD identifier, and wherein the fourth data is independent of the first data.

12. The electronic device of claim 10, wherein the first service and the second service include one of a mission critical service (MCX) and an internet protocol (IP) multimedia subsystem (IMS) service.

* * * * *